United States Patent [19]

Hart

[11] Patent Number: 5,773,590
[45] Date of Patent: Jun. 30, 1998

[54] METHODS OF SEPARATING LIGNIN SOLIDS AND BLACK LIQUOR FROM TALL OIL FATTY ACIDS

[75] Inventor: Paul R. Hart, The Woodlands, Tex.

[73] Assignee: BetzDearborn Inc., Trevose, Pa.

[21] Appl. No.: 835,779

[22] Filed: Apr. 8, 1997

[51] Int. Cl.$^6$ .............................. C07G 1/00; C08L 97/00
[52] U.S. Cl. ........................ 530/500; 530/504; 530/505; 106/123.1
[58] Field of Search ..................................... 530/500, 504, 530/505; 106/123.1

[56] References Cited

U.S. PATENT DOCUMENTS

| | | | |
|---|---|---|---|
| 2,802,845 | 8/1957 | Sadler | 530/500 |
| 3,890,295 | 6/1975 | Lieberman et al. | 530/500 |

*Primary Examiner*—Nathan M. Nutter
*Attorney, Agent, or Firm*—Alexander D. Ricci; Steven D. Boyd

[57] ABSTRACT

The separation of black liquor, containing lignin, from tall oil is enhanced by the addition of a separation aid. The separation aid is an alkylphenol-formaldehyde resin alkoxylate, a poly (proplyene oxide) ethoxylate, an alkanol amine condensate, or combination thereof.

4 Claims, No Drawings

METHODS OF SEPARATING LIGNIN SOLIDS AND BLACK LIQUOR FROM TALL OIL FATTY ACIDS

FIELD OF THE INVENTION

The present invention relates to improvements in the production of tall oil fatty acids from crude tall oil soap skimmings. More particularly, the present invention relates to a method of improving the separation of lignin solids and black liquor from tall oil fatty acids through addition of a separation aid to crude tall oil soap skimmings.

BACKGROUND OF THE INVENTION

In the production of paper by the kraft process, black liquor results from the cooking of pulp wood in an alkaline solution. The black liquor is a source of lignin and tall oil. These materials are recovered from the black liquor by acidification of soap skimmings, cooking and separation. The skimmed soap separated from black liquor consists of a mixture of emulsified tall oil soaps and lignin. This mixture is cooked, in the presence of an acid, and is separated by decantation or centrifuge.

The use of water soluble, typically anionic dispersants such as condensed naphthalene sulfonic acid sodium (available as Tamol SN from Rohm & Haas), short-chain acetylenic glycols, tannic acids, lignosulfonates, and hexametaphosphates is known to aid the separation of the tall oil and the lignin. Such a process is described in U.S. Pat. No. 2,802,845. In this process, the dispersant by dispersing the soap into the acid, accelerates its acidification and thereby enhances the separation process.

However, it has been found that such prior processes do not provide for a complete separation of the black liquor lignin mixture from the tall oil. The carryover of black liquor lignin into the tall oil decreases the quality of tall oil produced.

SUMMARY OF THE INVENTION

The present inventor discovered that the separation of tall oil from lignin solids and black liquor could be enhanced by the addition of specific non-dispersing oil or water soluble surfactants into the system. It was discovered that the addition of specific classes of nonionic, oil soluble surfactants or cationic water soluble surfactants to a tall oil separator system enhanced the separation of lignin solids and black liquor from the tall oil. The surfactants used in the method of the present invention include alkyl phenol-formaldehyde resin alkoxylates, poly (propylene oxide) ethoxylates and alkanol amine condensates. The surfactants can be added to a tall oil separator system at the evaporators, the acidulator, the cooker or any other appropriate feedpoint. The surfactants of the methods of the present invention can be employed alone or in combination with prior art tall oil separator treatments such as water soluble, anionic dispersants.

DESCRIPTION OF THE PREFERRED EMBODIMENTS

In a paper mill which employs the kraft process, tall oil can be recovered from the black liquor by a continuous acidification of the soap skimming. The soap skimmings separated from the black liquor consist of a mixture of emulsified tall oil soaps and lignin. In the prior art, water soluble, anionic dispersants were added to such emulsions to aid separation. Such dispersants were added to the acidic aqueous phase to preferentially water wet and intensify the repulsive anionic change on the lignin fraction allowing an improved separation of the tall oil from the lignin, now dispersed in the aqueous black liquor. The present inventor discovered that specific classes of water or oil soluble surfactants markedly improved the separation of the tall oil from the aqueous black liquor when added to a tall oil recovery system. The oil or water soluble surfactants of the present invention can be added at any point in a tall oil recovery process including but not limited to the soap/black liquor mixture, at the acidification stage or prior to separation. The oil or water soluble surfactants of the present invention may be employed alone or in a combination as well as with prior art treatments such as dispersants or napthalene sulfonate condensates.

The oil soluble, nonionic surfactants of the present invention include alkyl phenol-formaldehyde resin alkoxylates and poly (propylene oxide) ethoxylates. The water soluble, cationic surfactants include alkanol amine condensates. The alkyl phenol-formaldehyde resin alkoxylates useful in the present invention can include t-butyl, t-amyl and nonylphenol-formaldehyde resin ethoxylates preferably in the 1000 to 5000 MW range made from the acid or base catalyzed condensation of alkylphenol and formaldehyde followed by base catalyzed reaction with 25–75% ethylene oxide. The poly (propylene oxide) ethoxylates useful in the method of the present invention can include propylene oxide/ethylene oxide block copolymers preferably in the 2000 to 10,000 MW range made from the base catalyzed reaction of propylene oxide with propylene glycol, glycerine, trimethylolpropane or ethylene diamine followed by further reaction with 20–60% ethylene oxide. The alkanol amine condensates useful in the method of the present invention can include condensates of mono-, di- or tri-ethanolamine. These classes of surfactants, alone and in combination, were found to enhance the separation of lignin and black liquor from tall oil in a kraft paper mill tall oil recovery process.

The oil or water surfactants used in the method of the present invention are added to a tall oil recovery process in an amount sufficient to provide the desired separation of ligniniblack liquor from the tall oil. It has been found that effective separation can be accomplished by treatment amounts ranging from about 50 to 1000 parts treatment per million parts total fluid. Preferably treatment amounts from about 410 to 1000 parts per million when added to the soap skimmer and 50–200 parts per million when added to the cooker. The temperature of the treatment can range from about 30°–300° F., preferably 1500°–300° F.

The present invention will now be further described with reference to a number of specific examples which are to be regarded solely as illustrative and not as restricting the scope of the present invention.

EXAMPLE 1

Samples from the soap skimmer outlet of a tall oil separator process at a Southern U.S. kraft paper mill were gathered. Seventy-five milliliter portions were treated with the treatments as set forth in Table 1. The treated samples were mixed, heated to 190° F., shaken, and then let stand to determine the rate at which soap rose to the top of the black liquor. The samples were then centrifuged for ten minutes. The volume of sediment, black liquor and brown soap was recorded. The results are tabulated in Table 1. (Total volume exceeds 75 mL because of air entrained in the soap.)

TABLE 1

| Treatment | Dose (ppm) | Break Rate (min) | Volume After Centrifuge (mL) | | |
|---|---|---|---|---|---|
| | | | Sediment | Liquor | Soap |
| A | 1000 | >10 | 0.15 | 39.5 | 50 |
| B | 1000 | 1 | 0.30 | 40.0 | 50 |
| C | 1000 | >10 | N/T | N/T | N/T |
| D | 1000 | 3 | N/T | N/T | N/T |
| Control | — | >10 | 0.13 | 39.0 | 50 |

N/T = not tested

The data of Table 1 shows that surfactants of the present invention can accelerate the rate of separation of black liquor and improve the sedimentation of lignin from saponified tall oil soaps.

EXAMPLE 2

Samples of soap fed to the cooker of a tall oil separator process at a Southern U.S. kraft paper mill were gathered. Seventy-five milliliter portions were treated with the treatments as set forth in Table 2. These samples were heated to 210° F. then shaken at high speed for 2.5 hours with a 16% sulfuric acid solution at a 3:1 soap:acid ratio. The clarity of the phases and the rate at which they separated was recorded. The samples were centrifuged for two minutes at 210° F. The amount of sediment, free water and tall oil continuous layers were recorded. The clarity of the water and apparent cleanness (absence of lignin) of the sulfuric acid/tall oil interface was recorded. The quality of the tall oil was checked by thiefing 6.25 mL from the middle of the oil phase, cutting 50/50 with toluene and centrifuging for 10 minutes at high speed. The residual sediment and water were recorded. Table 2 summarizes the results.

TABLE 2

| Treatment | Dose (ppm) | Acid Clarity | Break Rate (min) | Sed. (mL) | Acid (mL) | Oil (mL) | I/F Clean. | Res. Sed. + H$_2$O |
|---|---|---|---|---|---|---|---|---|
| A | 100 | Lt. | 1 | 3 | 43 | 27 | 2 | 1.0 |
| B | 40 | Dk. | 5 | 3 | 43 | 25 | 4 | not run |
| B | 80 | Dk. | 2.5 | 3 | 45 | 24.5 | 2.5 | 0.8 |
| B | 96 | Dk. | 2 | 2 | 43 | 26 | 4 | 1.6 |
| C | 150 | Lt. | 4 | 4.5 | 45 | 22.5 | 3 | 0.5 |
| D | 75 | Lt. | 2 | 5 | 45 | 24 | 1 | 0.4 |
| D | 150 | Lt. | 1 | 6 | 45 | 23 | 1 | 0.35 |
| D | 180 | Lt. | 2 | 4 | 44 | 25 | 2 | 0.6 |
| control | — | Dk. | 4 | 3 | 45 | 23 | 4 | 1.33 |
| D/B | 120/32 | Lt. | 1 | 3 | 43 | 28 | 1 | 0.6 |
| D/B | 90/48 | Lt. | 1 | 3 | 44 | 26 | 2 | 0.6 |
| D/B | 90/105 | Lt. | 1 | 4 | 44 | 26 | 1 | 0.6 |
| D/B/E | 60/32/70 | Lt. | 1 | 2 | 44 | 27 | 2 | 0.8 |
| B/E | 48/105 | Dk. | 3 | 3 | 44 | 25 | 3 | 1.6 |
| E | 210 | Dk. | 4 | 3 | 44 | 25 | 3 | 1.6 |

Sed.=sediment; I/F clean=interface cleanness (mL of lignin); Res. Sed.+H$_2$O=thiefed residual sediment and water (mL), Lt.=light, Dk.=dark.

The data of Table 2 shows that the surfactants of the present invention significantly accelerated the rate, increased the amount, and improved the interfacial quality of the separation of black liquor and lignin from tall oil fatty acid in sulfuric acid solutions.

Table 3 summarizes the treatments tested.

TABLE 3

| Treatment | Description |
|---|---|
| A | poly(propyleneglycol) ethoxylate, water or oil solvent base |
| B | ethanolamine condensate, water solvent base |
| C | nonylphenol-formaldehyde resin ethoxylate, oil solvent base |
| D | blend of nonylphenol-formaldehyde resin ethoxylates and poly(propylene glycol) ethoxylates, oil solvent base |
| E | naphthalene-formaldehyde sodium sulfonate salt (Tamol SM, available from Rohm & Haas) |

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. In a process for the separation of black liquor, containing lignin, from tall oil, the step of adding to a process stream containing lignin, black liquor, and tall oil, a separation aid selected from the group consisting of $C_4$–$C_9$ alkyl phenol-formaldehyde resin alkoxylates, poly (proplyene oxide) ethoxylates, and ethanol amine condensates and combinations thereof, whereby the separation into phases of black liquor, containing lignin, and tall oil is enhanced.

2. The process of claim 1 wherein said separation aid further includes a napthalene sulfonate condensate.

3. A method of enhancing the separation of black liquor, containing lignin, and tall oil in a system where black liquor, containing lignin, is separated from tall oil which comprises adding to the system a separation aid selected from the group consisting of $C_4$–$C_9$ alkyl phenol-formaldehyde resin ethoxylates, ethanol amine condensates and combinations thereof.

4. The method of claim 3 wherein said separation aid further includes a napthalene sulfonate condensate.

* * * * *